US011525657B2

(12) United States Patent
Cobb et al.

(10) Patent No.: US 11,525,657 B2
(45) Date of Patent: Dec. 13, 2022

(54) MEASURING WHEEL WITH FIXED STAND

(71) Applicant: APEX BRANDS, INC., Apex, NC (US)

(72) Inventors: Ian Michael Cobb, Wixom, MI (US); David Jonathan Byron, Southfield, MI (US); John Medicus, Anderson, SC (US)

(73) Assignee: Apex Brands, Inc., Apex, NC (US)

( * ) Notice: Subject to any disclaimer, the term of this patent is extended or adjusted under 35 U.S.C. 154(b) by 568 days.

(21) Appl. No.: 16/473,350

(22) PCT Filed: Dec. 8, 2017

(86) PCT No.: PCT/US2017/065231
§ 371 (c)(1),
(2) Date: Jun. 25, 2019

(87) PCT Pub. No.: WO2018/125536
PCT Pub. Date: Jul. 5, 2018

(65) Prior Publication Data
US 2020/0124392 A1 Apr. 23, 2020

Related U.S. Application Data

(60) Provisional application No. 62/440,065, filed on Dec. 29, 2016.

(51) Int. Cl.
G01B 3/12 (2006.01)
(52) U.S. Cl.
CPC ....................................... G01B 3/12 (2013.01)
(58) Field of Classification Search
CPC ........................................................ G01B 3/12

USPC .................................. 33/779, 780, 781, 782
See application file for complete search history.

(56) References Cited

U.S. PATENT DOCUMENTS

| 2,817,457 | A | * | 12/1957 | Liljenberg | A01C 15/16 222/311 |
| 3,616,541 | A | * | 11/1971 | Crayton | G01B 3/12 33/781 |
| 3,696,510 | A | * | 10/1972 | Evans, Jr. | G01B 3/12 235/96 |
| 4,180,184 | A | * | 12/1979 | Florer | A01C 15/02 222/473 |
| 4,635,818 | A | * | 1/1987 | Glass | A01C 15/02 239/685 |
| 8,479,407 | B2 | * | 7/2013 | Nepil | G01B 3/12 33/772 |

(Continued)

FOREIGN PATENT DOCUMENTS

TW M532027 U 11/2016

OTHER PUBLICATIONS

International Search Report and Written Opinion of PCT/US2017/065231, dated Feb. 2, 2018, all pages enclosed herein.

Primary Examiner — George B Bennett
(74) Attorney, Agent, or Firm — Burr & Forman LLP

(57) ABSTRACT

A measuring wheel may include a wheel assembly comprising a first wheel and a second wheel, a handle operably coupled to a shaft, a housing to which the shaft and the wheel assembly are operably coupled, and a fixed stand disposed at a portion of the housing substantially between the first and second wheels.

11 Claims, 4 Drawing Sheets

(56) References Cited

U.S. PATENT DOCUMENTS

| | | | |
|---|---|---|---|
| 8,522,448 B2* | 9/2013 | Lai | G01B 3/12 33/782 |
| 8,572,861 B2* | 11/2013 | Lai | G01B 3/12 33/779 |
| 9,964,390 B2* | 5/2018 | Lai | G01B 3/12 |
| D863,082 S * | 10/2019 | Cobb | G01B 3/12 D10/70 |
| 2007/0084076 A1 | 4/2007 | Wang | |
| 2009/0217542 A1* | 9/2009 | Watkins | B65D 83/203 33/775 |
| 2011/0180626 A1 | 7/2011 | Kang | |
| 2012/0102772 A1 | 5/2012 | Nepil | |
| 2018/0073847 A1* | 3/2018 | Wang | G01B 3/12 |
| 2018/0073848 A1* | 3/2018 | Wang | G01B 3/12 |

* cited by examiner

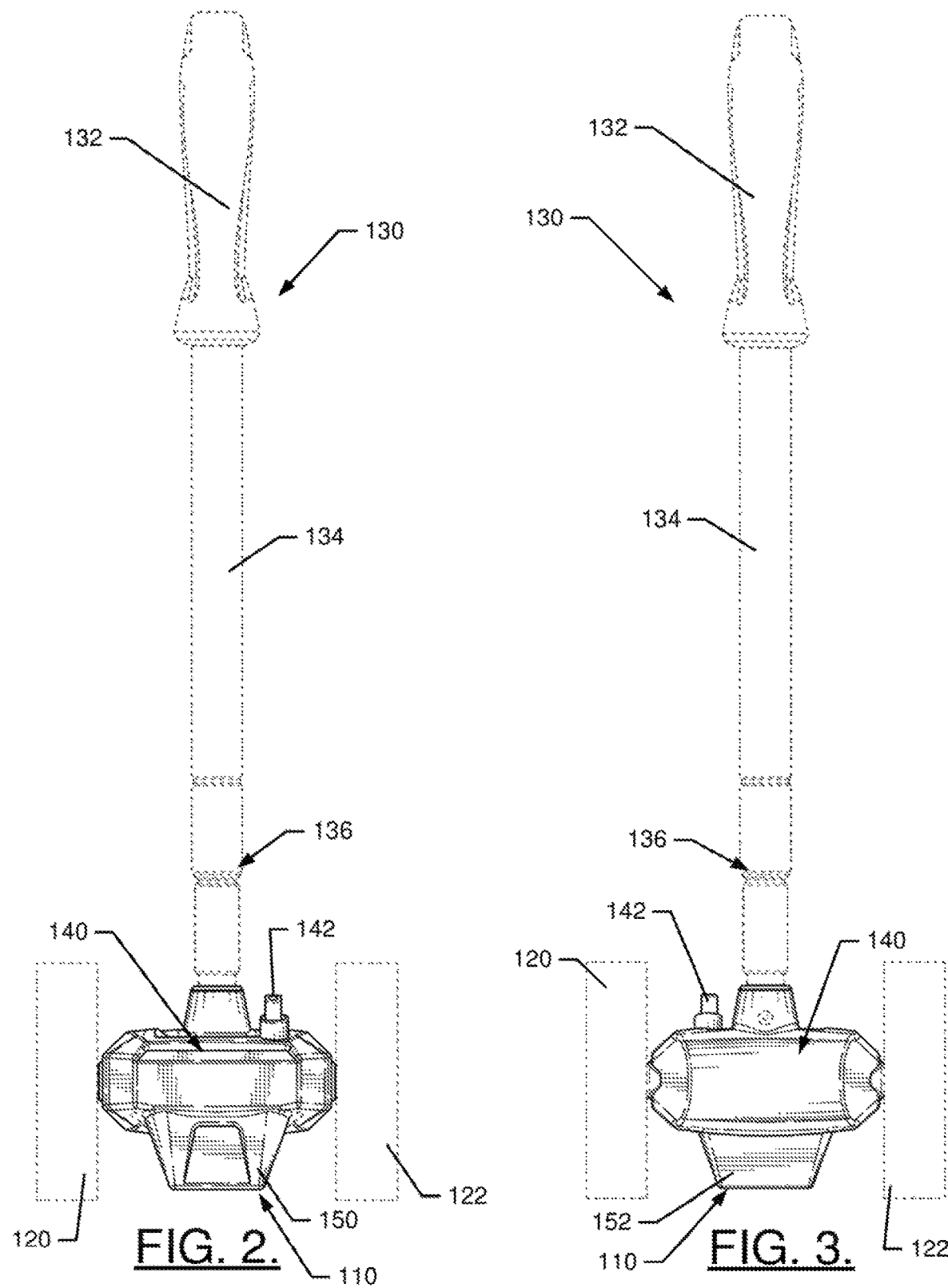

MEASURING WHEEL WITH FIXED STAND

CROSS REFERENCE TO RELATED APPLICATIONS

This application claims priority to U.S. application No. 62/440,065 filed Dec. 29, 2016, the entire contents of which are hereby incorporated by reference in their entirety.

TECHNICAL FIELD

Example embodiments generally relate to measuring equipment and, in particular, relate to a measuring device having a fixed stand.

BACKGROUND

Typical measuring tools such as wheeled markers and measuring wheels may be used in surveying, sports, and other activities. Some measuring wheels may have a shaft that extends upwardly from a wheel assembly to allow the operator to control the measuring wheel. Certain capabilities for starting, stopping and resetting measuring functions may be executable at the handle the operator grasps, or at a housing provided proximate to the wheel assembly. Other functions may also be provided at the housing or at the handle. However, when the measuring wheel is not under the positive control of the operator, the measuring wheel may be relatively unstable. As such, it may often be necessary to hang the measuring wheel for storage, since it does not stand on its own. Moreover, when not hung or in use, the measuring wheel may need to be laid on the ground thereby rendering it more susceptible to damage, and also taking up more space than would otherwise be preferred.

BRIEF SUMMARY OF SOME EXAMPLES

Some example embodiments may enable the provision of a measuring wheel having a fixed stand to allow for temporary or permanent storage of the measuring wheel in a more convenient and space efficient way.

In an example embodiment, a measuring wheel may be provided. The measuring wheel may include a wheel assembly comprising a first wheel and a second wheel, a handle operably coupled to a shaft, a housing to which the shaft and the wheel assembly are operably coupled, and a fixed stand disposed at a portion of the housing substantially between the first and second wheels.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 2 illustrates a front view of the measuring wheel of FIG. 1 according to an example embodiment;

FIG. 3 illustrates a rear view of the measuring wheel of FIG. 1 according to an example embodiment;

DETAILED DESCRIPTION

Figure 1:
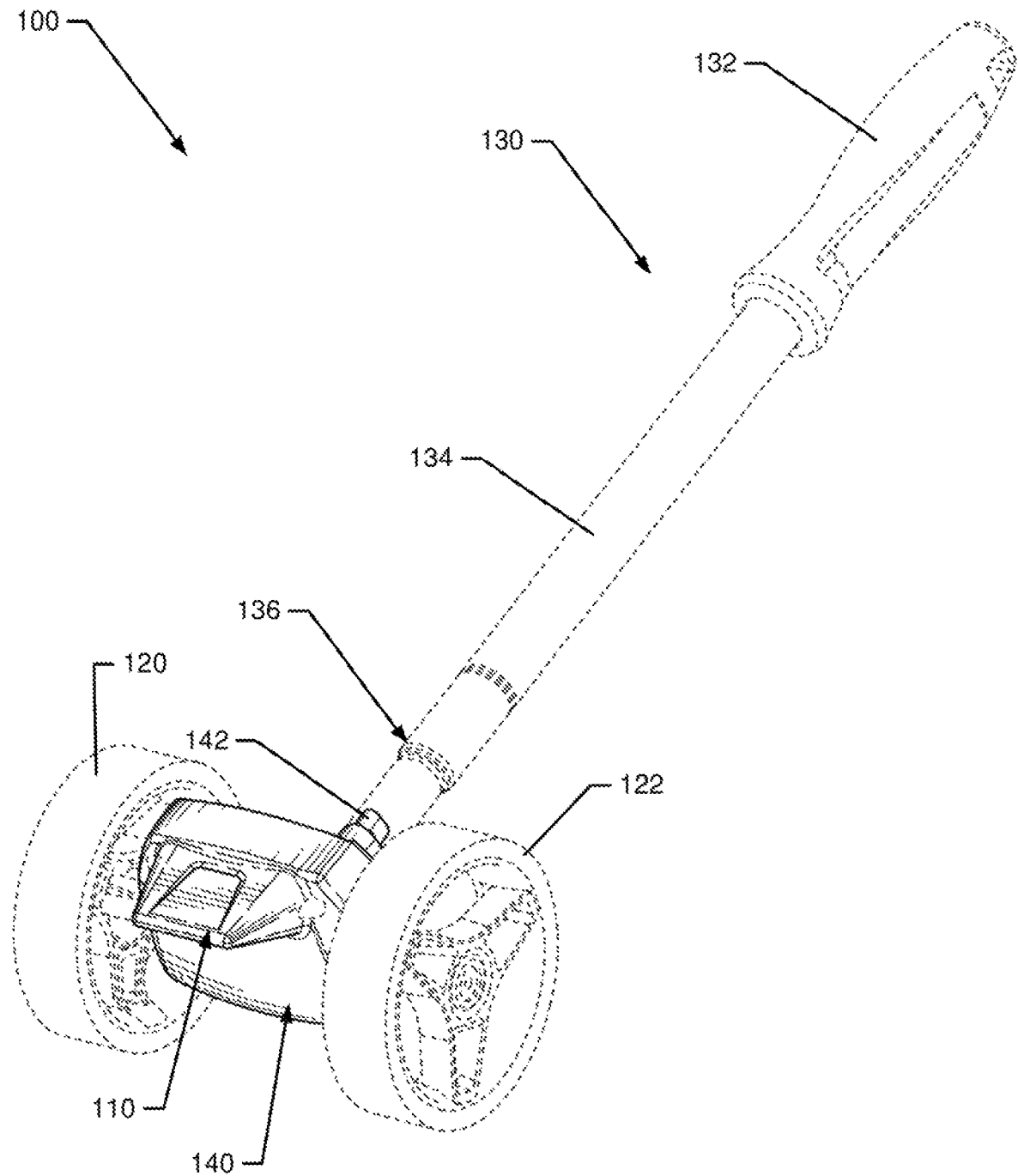
FIG. 1 illustrates a perspective view of a measuring wheel in accordance with an example embodiment.
Figure 4:
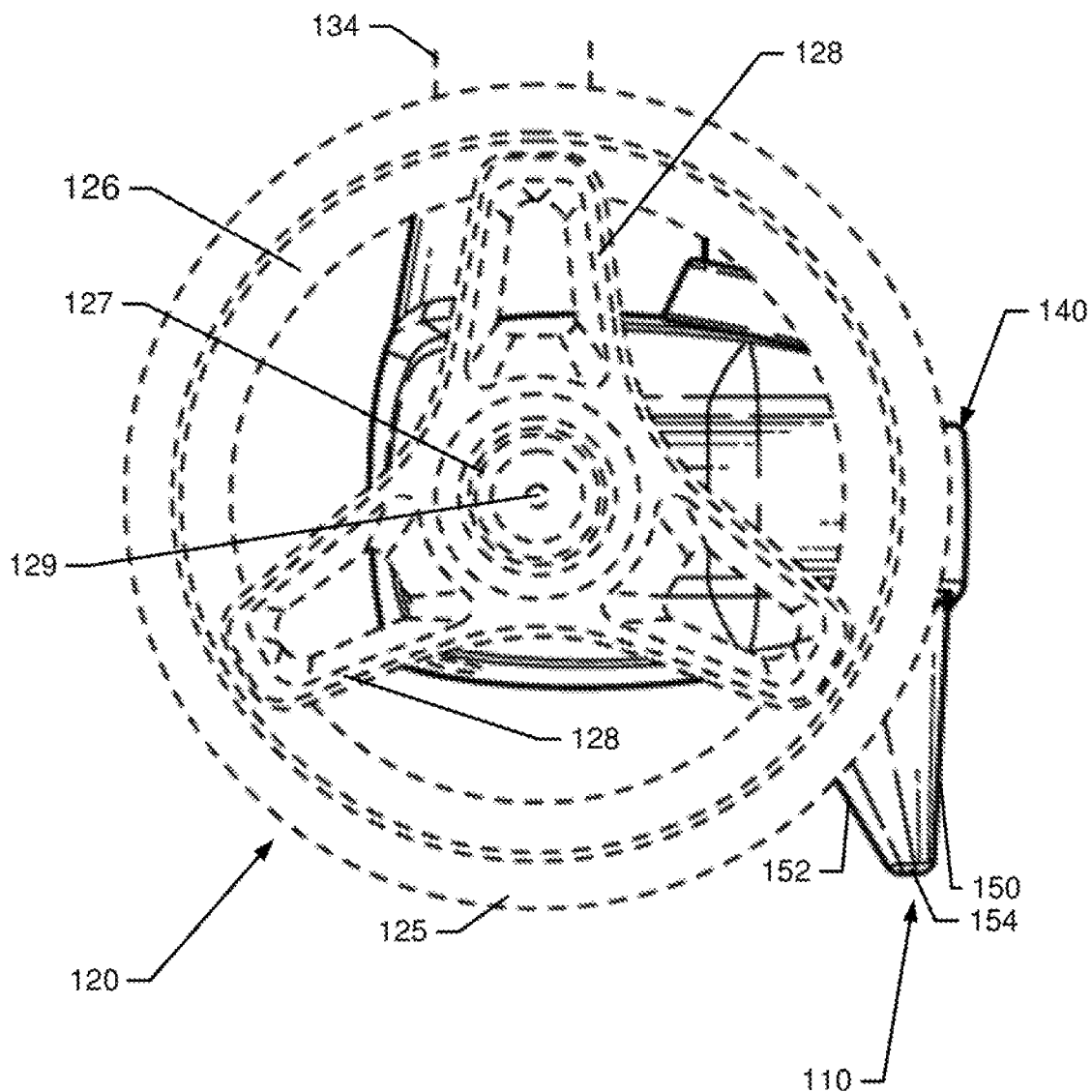
FIG. 4 illustrates a right side view of the measuring wheel of FIG. 1 according to an example embodiment.
Figure 5:
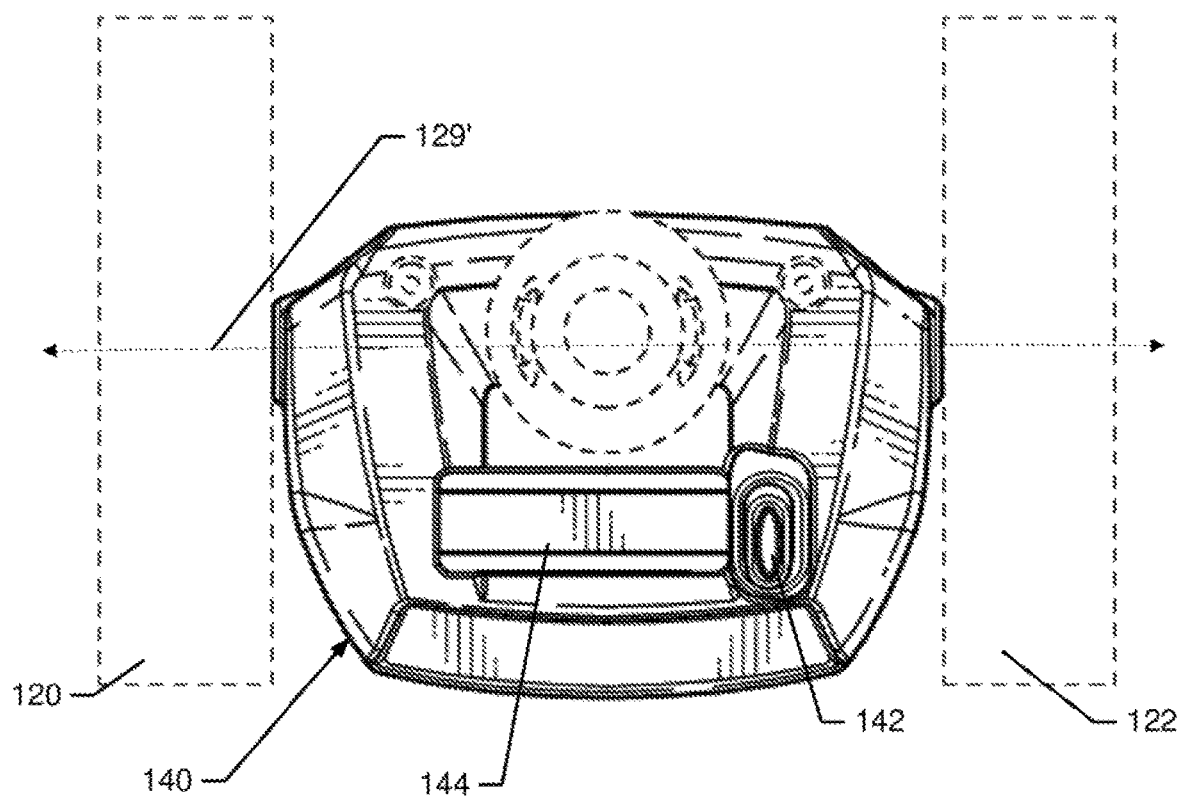
FIG. 5 illustrates a top view of a housing of the measuring wheel of FIG. 1 according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. The terms "measuring wheel" and "measuring device" as used herein, shall be interpreted as a device employing a wheel or perambulator that may be directly or indirectly used to perform an actual or approximate measurement, surveying or marking of a surface.

FIG. 1 illustrates a perspective view of the measuring wheel 100 in accordance with an example embodiment. FIGS. 2-5 illustrate other views of the measuring wheel 100 to facilitate further discussion of the structures associated therewith in accordance with an example embodiment. In FIGS. 1-5, some portions of the measuring wheel 100 are shown in dashed lines merely to distinguish various portions of the measuring wheel 100. The dashed lines have no other significance.

The measuring wheel 100 has a fixed stand 110 provided between a first wheel 120 and a second wheel 122 (which combine to define a wheel assembly). The first and second wheels 120 and 122 may each include a tire portion 125, which surrounds a rim portion 126 (see FIG. 4). However, the rim portion 126 and the tire portion 125 could be combined in some examples. If a rim portion 126 is included, the rim portion 126 may be operably coupled to a wheel hub 127 via one or more spoke assemblies 128. The spoke assemblies 128 may include individual spoke members that are disposed to form at least three spoke assemblies 128 that are spaced apart from each other. The spoke assemblies 128 may combine to form a Y shape, with three similarly shaped structures extending between the wheel hub 127 and the rim portion 126. In an example embodiment, an axis of rotation 129 may be defined for each of the first and second wheels 120 and 122. The axis of rotation 129 may be defined to extend along or through the wheel axle 129' about which the first and second wheels 120 and 122 turn.

The measuring wheel 100 also includes a handle assembly 130 that is defined by a handle 132 and a shaft 134. In some cases, the handle assembly 130 may further include an extension joint 136, which may allow the shaft 134 to be extended or contracted in length. The shaft 134 may, in examples that employ the extension joint 136, include two tubes that are enabled to be fixed relative to each other to change the length of the shaft 134 via alternate loosening and tightening of the extension joint 136. In an example embodiment, the direction of extension of the shaft 134 may be substantially perpendicular to the wheel axle 129' about which the first and second wheels 120 and 122 turn.

The wheel axle 129' about which the first and second wheels 120 and 122 turn may extend through a housing 140 that houses one or more functional components of the measuring wheel 100. The functional components may include a function button 142 and/or a display 144 (see FIG.

5). The function button 142 may be used to control the operation of an accessory that may be housed in or otherwise operably coupled to the housing 140. The accessory may be, for example, a counter, a marking device, a pneumatic tool, a camera, or the like. In an example embodiment in which the accessory is a marking device, the marking device may include chalk, paint and/or the like. In an example embodiment in which the accessory is a pneumatic tool, the accessory may be, for example, a stake driver, nail gun, or the like. The operator may depress the function button 142 to start the performance of a function (e.g., counting, applying a marking, etc.) and release the function button 142 to stop the performance of the function. However, in other instances, the function button 142 may operate to reset a counter or start/stop various other functions of the measuring wheel 100.

In some cases, the function button 142 may energize/de-energize the display 144 and/or reset the information displayed thereon. The display 144 may be a digital display or an analog display that includes numerals mounted to rotating wheels connected to each other by gears.

In some embodiments, the measuring wheel 100 may include a distance counter disposed within the housing 140, and operably coupled to the display 144. The distance counter may be configured to determine a distance, such as the travel distance of the measuring wheel 100. The distance counter may be gear driven with operable coupling to one or both of the first and second wheels 120 and 122 to provide distance determination based on the number of revolutions made by the one or both of the first and second wheels 120 and 122. In an example embodiment, the measuring wheel 100 may include a wheel lock to inhibit travel of the first and second wheels 120 and 122 when the distance counter is not activated, or when the measuring wheel 100 is in a rest state (i.e., a non-operational state).

As shown in FIGS. 1-5, the housing 140 may extend slightly rearward from the wheel axle 129' to support the full diameter of the shaft 134. The housing 140 may also extend forward from the wheel axle 129' by a distance substantially equal to the radius of each of the first and second wheels 120 and 122. The fixed stand 110 may extend in a downward direction from a forward-most portion of the housing 140 to allow the fixed stand 110 to engage the ground and hold the shaft 134 substantially perpendicular to the ground in the rest position of the measuring wheel 100. When the handle 132 is pulled rearward by the operator (e.g., to the position shown in FIG. 1), the fixed stand 110 is pivoted out of contact with the ground about the wheel axle 129' and into the operating position. The first and second wheels 120 and 122 can then rotate freely to allow the distance counter to be employed, or otherwise allow the measuring wheel 100 to operate. If the operator rotates the handle 132 forward, the shaft 134 tilts forward to a position substantially perpendicular to the ground when the fixed stand 110 contacts the ground to hold the measuring wheel 100 in the rest position again. As can be seen from FIG. 4, an axis of the shaft 134 extends away from the housing 140 from a point disposed rearward of the wheel axle 129'. This arrangement provides balance for the measuring wheel 100 in the rest position. Specifically, the weight of the housing 140 and the fixed stand 110 that is disposed forward of the center of mass (and farther from the wheel axle 129') of the measuring wheel 100 is balanced by the weight of the shaft 134 that is disposed rearward of the wheel axle 129' and closer to the center of mass. However, by making the forward and rearward extent of the housing 140 less than the diameter of the first and second wheels 120 and 122, the convenient aspect of providing a balanced measuring wheel that can be supported in a standing position nevertheless does not increase the size of the measuring wheel 100 at least with respect to the amount of storage space the measuring wheel 100 consumes. Thus, the measuring wheel 100 remains small, easy to transport or store, and yet far more capable and convenient than previous models.

Various structures could be employed to define the fixed stand 110. However, in an example embodiment, the fixed stand 110 may include a front wall 150 and a rear wall 152 that each extend downward toward the ground from the housing 140. The front wall 150 may be substantially perpendicular to the ground in the rest position, and the rear wall 152 may be angled forward as it extends toward the ground in the rest position. The front wall 150 and rear wall 152 may be separated from each other by a base portion 154 that extends substantially parallel to the ground in the rest position. As shown in FIGS. 2 and 3, the front and rear walls 150 and 152 may taper as they extend away from the housing 140.

By providing the fixed stand 110, the measuring wheel 100 can be stored efficiently and conveniently in the rest position. However, the measuring wheel 100 can also easily be put into the rest position between uses or while the operator is tending to other activities without requiring the measuring wheel 100 to be laid on the ground so that the operator has to bend over to pick it up before returning the measuring wheel 100 to use.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A measuring wheel comprising:
   a wheel assembly comprising a first wheel and a second wheel;
   a handle operably coupled to a shaft;
   a housing to which the shaft and the wheel assembly are operably coupled; and
   a fixed stand disposed to extend downward from a forward-most at a portion of the housing substantially between the first and second wheels.

2. The measuring wheel of claim 1, wherein the first and second wheels each rotate about a wheel axle, and wherein the fixed stand is disposed at portion of the housing that is separated from the wheel axle by a distance substantially equal to a radius of each of the first and second wheels.

3. The measuring wheel of claim 2, wherein the fixed stand comprises a front wall and a rear wall that each taper as the front and rear walls extend away from the housing.

4. The measuring wheel of claim 2, further comprising a distance counter configured to measure a distance traveled during rotation of the wheel.

5. The measuring wheel of claim 4, wherein the distance counter is controlled by a functional button disposed at a side of the housing that is opposite the side from which the fixed stand extends.

6. The measuring wheel of claim 4, wherein the distance counter provides a visual output via a display disposed at a side of the housing that is opposite the side from which the fixed stand extends.

7. The measuring wheel of claim 2, wherein the fixed stand engages the ground to define a rest position of the measuring wheel, and wherein the shaft is substantially perpendicular to the ground when the measuring wheel is in the rest position.

8. The measuring wheel of claim 7, wherein an axis of the shaft extends away from the housing from a point disposed rearward of the wheel axle.

9. The measuring wheel of claim 1, wherein each of the first and second wheels includes a spoke assembly defining a substantially Y shape extending between a wheel hub and a rim portion.

10. The measuring wheel of claim 1, wherein the first and second wheels each have a same diameter and a same radius, wherein the housing extends forward of a wheel axle that operably couples the first and second wheels by a distance substantially equal to the radius of the first and second wheels, and wherein the housing extends rearward of the wheel axle by a distance less than the radius of the first and second wheels.

11. The measuring wheel of claim 1, wherein the first and second wheels each have a same diameter, and wherein a length of the housing in a forward to rearward direction is less than the diameter of the first and second wheels.

\* \* \* \* \*

UNITED STATES PATENT AND TRADEMARK OFFICE
CERTIFICATE OF CORRECTION

| | | |
|---|---|---|
| PATENT NO. | : 11,525,657 B2 | |
| APPLICATION NO. | : 16/473350 | |
| DATED | : December 13, 2022 | |
| INVENTOR(S) | : Ian Michael Cobb et al. | |

It is certified that error appears in the above-identified patent and that said Letters Patent is hereby corrected as shown below:

In the Claims

In Column 4, Claim 1, Line 66, "at a portion of" should read --portion of--

Signed and Sealed this
Eleventh Day of April, 2023

*Katherine Kelly Vidal*

Katherine Kelly Vidal
*Director of the United States Patent and Trademark Office*